United States Patent [19]

Oike et al.

[11] Patent Number: 4,545,200
[45] Date of Patent: Oct. 8, 1985

[54] EXHAUST DEVICE OF A TWO-CYCLE ENGINE FOR A MOTORCYCLE

[75] Inventors: Ikuo Oike, Niiza; Takahide Miyata, Kawagoe, both of Japan

[73] Assignee: Honda Giken Kogyo Kabushiki Kaisha, Tokyo, Japan

[21] Appl. No.: 534,295

[22] Filed: Sep. 21, 1983

[30] Foreign Application Priority Data

Sep. 22, 1982 [JP] Japan ............................ 57-143882[U]
Sep. 22, 1982 [JP] Japan ............................ 57-143883[U]

[51] Int. Cl.⁴ ......................... F02B 27/02; F01N 7/00
[52] U.S. Cl. ........................................ 60/314; 60/312; 180/219; 180/225
[58] Field of Search ...................... 60/312, 313, 314; 180/219, 291, 296, 225

[56] References Cited

U.S. PATENT DOCUMENTS

| | | | |
|---|---|---|---|
| 3,254,484 | 6/1966 | Kopper | 60/312 |
| 3,367,311 | 2/1968 | Tenney | 60/314 |
| 4,226,296 | 10/1980 | Higaki | 180/219 |
| 4,336,864 | 6/1982 | Asaka | 181/255 |
| 4,412,597 | 11/1983 | Aiba | 180/291 |

FOREIGN PATENT DOCUMENTS

| | | | |
|---|---|---|---|
| 451201 | 10/1927 | Fed. Rep. of Germany | 60/314 |
| 1601350 | 11/1970 | Fed. Rep. of Germany | 60/312 |
| 112823 | 9/1980 | Japan | 60/312 |
| 132321 | 9/1980 | Japan | 60/314 |
| 447833 | 5/1936 | United Kingdom | 60/314 |

Primary Examiner—Douglas Hart
Attorney, Agent, or Firm—Lyon & Lyon

[57] ABSTRACT

An exhaust system of a two-cycle engine mounted on a motorcycle is provided with a subchamber branching off from the exhaust pipe. The subchamber is disposed by utilizing a so called dead space in the frame of the motorcycle, particularly in a position in front of the engine and between a pair of cradle pipes of a body frame on which the engine is mounted. With this arrangement, it becomes possible to layout the position of the subchamber without altering the configuration of the body frame, and there is further advantage that the subchamber is well protected by the structural members.

6 Claims, 12 Drawing Figures

EXHAUST DEVICE OF A TWO-CYCLE ENGINE FOR A MOTORCYCLE

BACKGROUND OF THE INVENTION

1. Field of the Invention

The present invention relates to an exhaust device of a two-cycle engine for a motorcycle.

2. Description of Background Information

It is well known that, in a two-cycle engine the positive pressure of a pulsating wave of the exhaust gas, reflected from an opening of the exhaust pipe is applied to the exhaust port during an end period of the exhaust cycle especially when the engine is operating at a high speed, thereby pushing back the combustion mixture which is coming out at the exhaust pipe, into the combustion chamber, to raise the engine output power.

However, if the size and the form of the exhaust pipe are designed for the efficiency at a high speed operation of the engine, the effect of raising the engine output power by the above process is limited only to the high speed range of the engine operation, and even a power down is resulted in the low speed operating range because a negative pressure of the pulsating wave is applied to the exhaust port and the combustion mixture is sucked out from the combustion chamber.

In order to eliminate this drawback, it has been proposed recently to provide an exhaust device which includes a subchamber branching off from the exhaust pipe or from a portion continuing from the exhaust port of the engine, and a control valve disposed at an entrance portion of the subchamber so as to open and close the path to the subchamber.

In this kind of exhaust device, the control valve is opened when the engine speed is low, so as to change the negative pressure of the pulsating wave at the exhaust port during the end of the period of the exhaust cycle into the positive pressure by means of the effect of the subchamber, to raise the engine output power. When the engine speed is high, the control valve is closed to eliminate the effect of the subchamber to prevent power reduction of the engine.

In mounting this type of exhaust device on a motorcycle, a care is needed for the layout because numbers of devices and parts are already arranged closely with each other on a frame having a limited dimension, so as not to produce a vacant space. Therefore, it is generally conceivable to dispose the subchamber in the side of the fuel tank or directly under the fuel tank. However, in the case of the former arrangement, there are some drawbacks such that the appearance of the motorcycle is spoiled or the driving position of a rider of the motorcycle is limited by the presence of the subchamber because of the necessity of keeping the knee of the rider away from the hot subchamber. In the case of the latter arrangement, there is also a drawback that the capacity of the fuel tank must be reduced because of a space required for the subchamber.

Furthermore, when, as described in Japanese Utility Model Provisional Publication No. 56-81123, the subchamber and a communicating tube portion formed between the exhaust port and the subchamber are made continuously with the body of the cylinder, these portions extending from the cylinder become long and that causes a difficulty in mounting the engine in the frame. Moreover, during the machining of the body of the cylinder, the workability of the machine has been reduced due to the presence of the elongated exhaust port portion.

SUMMARY OF THE INVENTION

An object of the present invention is therefore to provide an exhaust system of a two-cycle engine for a motorcycle, by which the layout of the position of the subchamber does not spoil the appearance of the motorcycle and the capacity of the subchamber is desirably determined.

Another object of the present invetion is to provide an exhaust device of a two-cycle engine by which the workability and the easiness of assembly during mounting the engine is improved, and also the workability of machining of the body of the cylinder is improved.

According to the present invention, the subchamber is disposed in a space in front of the engine and between a pair of cradle pipes on which the engine is mounted.

According to another aspect of the invention, a communicating tube is detachably disposed between an exhaust port of the engine and the exhaust pipe, and a supporting tube portion in which the valve body of the control valve is defined, is formed continuously with the communcating tube.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF THE PREFERRED EMBODIMENTS

Figure 1:
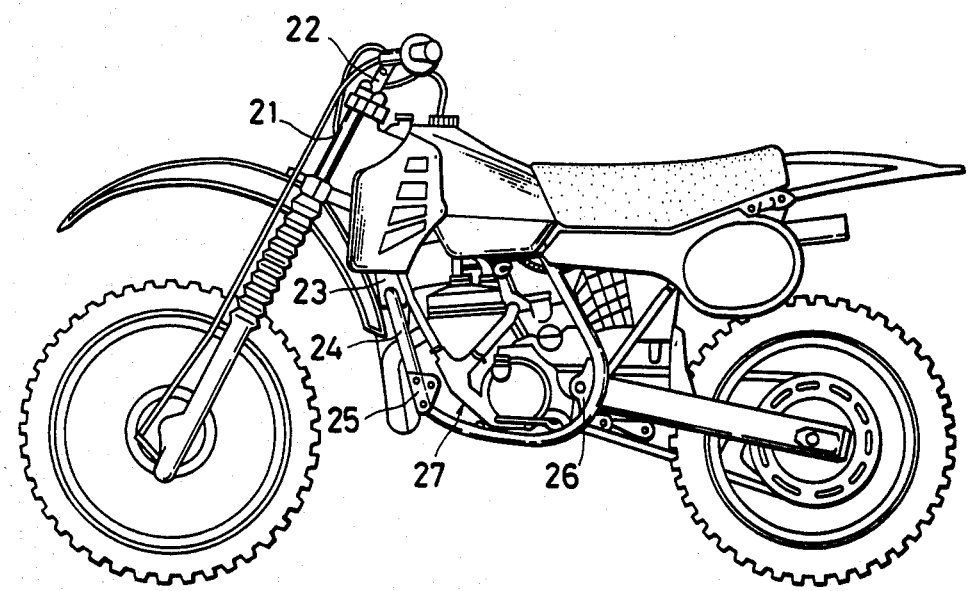
FIG. 1 is a side view of a motorcycle in which the exhaust device according to the present invention is to be mounted.

Before entering into the explanation of the embodiments of the exhaust device according to the present invention, reference is first made to FIG. 1 in which a motorcycle on which the exhaust device according to the present invention is to be mounted.

In FIG. 1, a frame of the motorcycle includes a head pipe 21 rotatably supporting a steering stem 22, a down tube 23 extending rearwardly from the head pipe 21, and a pair of cradle pipes 24 connected to the down tube 23. In a space surrounded by these elements of the frame, a two-cycle engine 27 is mounted by means of brackets 25 and 26 which are fixed to the cradle pipes 24.

Figure 2:
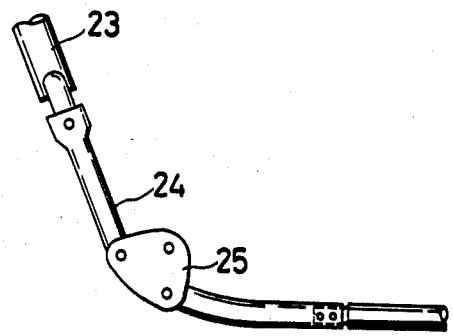
FIG. 2 is a side view showing a type of cradle pipe which is made up of two pieces for allowing an easy mounting of the engine.

FIG. 2 shows an example in which one of the cradle pipes 24 is made of a couple of pieces assembled with each other, so that the engine having an elongated exhaust port portion as described before can be mounted through a space formed by disassembling the cradle pipe. However, in the case of the cradle pipe of this type, it was rather troublesome to disassamble and assemble the cradle pipe, and further, there was a drawback of lowering the rigidity of the cradle pipe. Therefore, a configuration of the exhaust device which allows to mount the engine without disassembling the cradle pipe has been found more desirable.

Figure 3:
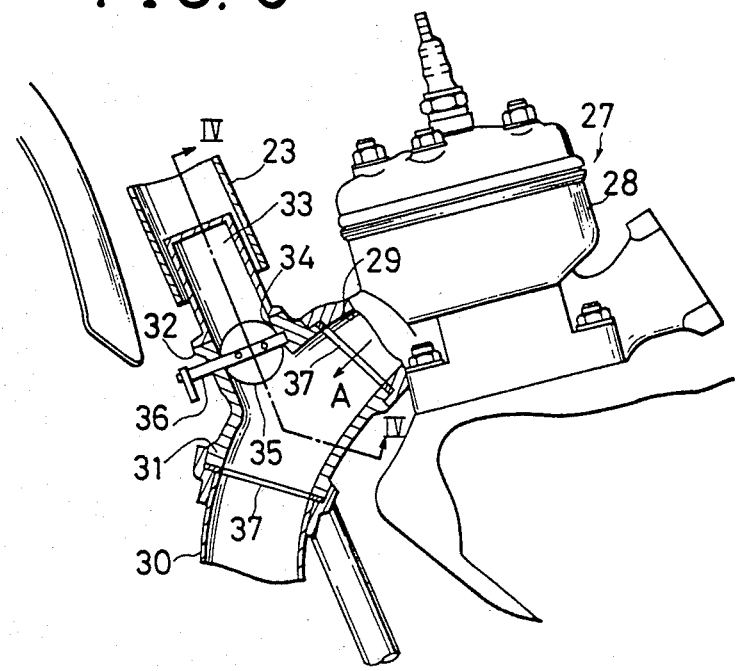
FIG. 3 is a partially cross sectional side view of a first embodiment of the exhaust device according to the present invention.
Figure 4:
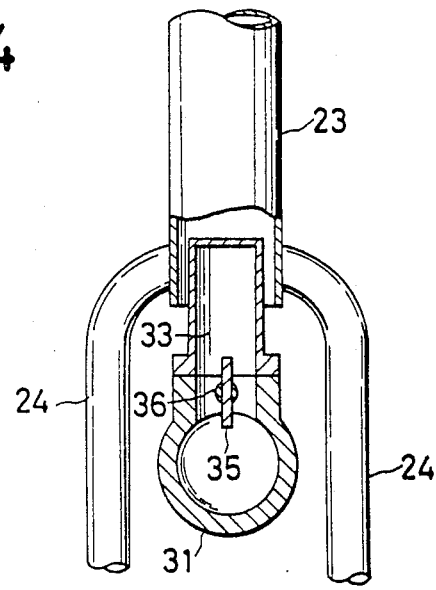
FIG. 4 is a cross sectional front view of the exhaust device taken along the line IV—IV of FIG. 3.

Reference is then made to FIGS. 3 and 4 in which a detailed construction of the exhaust system according to the present invention is illustrated. In the exhaust system, a communicating tube 31 is detachably disposed between an exhaust port 29 leading to the inside of the cylinder 28 and an exhaust pipe 30, to act as a part of a passage of the exhaust gas from the engine 27. A supporting tube 32 is branched off from the middle portion of the communicating tube 31, and a cylindrical subchamber 33 is connected at an opening portion of the supporting tube 32. As shown, the subchamber 33 has a diameter slightly smaller than that of the down tube 23 and an upper half of the subchamber 33 is disposed in an open lower end of the down tube 23 which extends rearwardly from the head pipe 21. In a communicating passage formed in the supporting tube 32, between the communicating tube 31 and the subchamber 33, there is provided a valve body having a valve 35 of control valve which opens during a low speed operation of the engine 27, and closes during a high speed operation of the engine 27. The valve 35 is a butterfly valve fixed to a shaft 36 which is rotatably mounted on the support tube 32. Furthermore, the direction of the shaft 36 is so determined as to be substantially parallel to the direction (shown by the arrow A) of the flow of the exhaust gas from the exhaust port 29. Moreover, a gasket 37 is respectively disposed at both ends of the communicating tube 31, thereby reducing the transmission of heat from the exhaust port 29 and from the exhaust pipe 30. With this provision, the bearing portions of the valve 35 are protected from heat. Therefore, a sufficient durability can be secured and a requirement of a cooling means such as a cooling water is eliminated.

Reference is now made to FIG. 4, in which a spatial relation among the down tube 33, the cradle pipes 24, and a portion of the exhaust system including the subchamber 33 is illustrated. As shown, the subchamber is located in a space of the lower end of the down tube 23 at which the cradle pipes 24 are connected. Therefore, there are advantages such that a dead space of the body of the motorcycle is effectively utilized and that the subchamber 33 is protected by the down tube 23. Further, the capacity of the subchamber is appropriately determined in accordance with the displacement of the engine because the length of the subchamber which is in the longitudinal direction of the down tube 23 is not subjected to a structural limitation.

Figure 5:
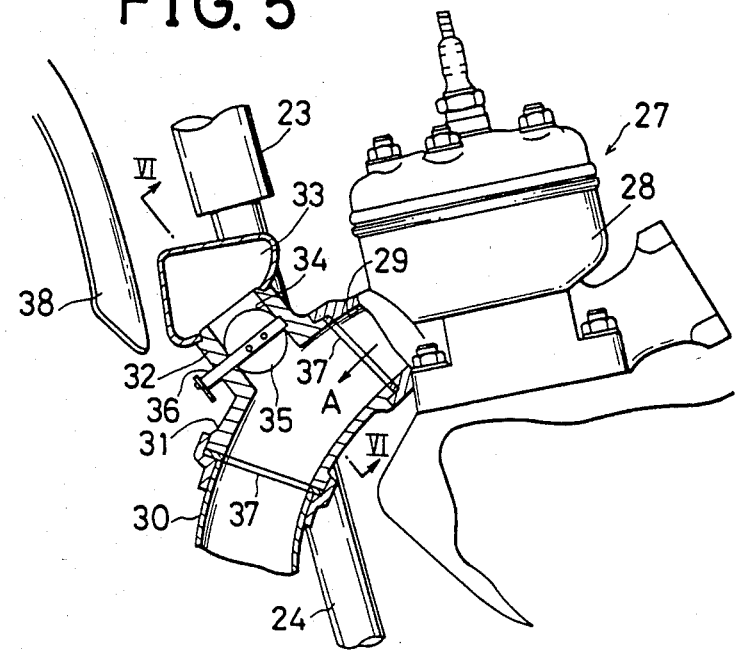
FIG. 5 is a partially cross sectional view of a second embodiment of the exhaust device.
Figure 6:
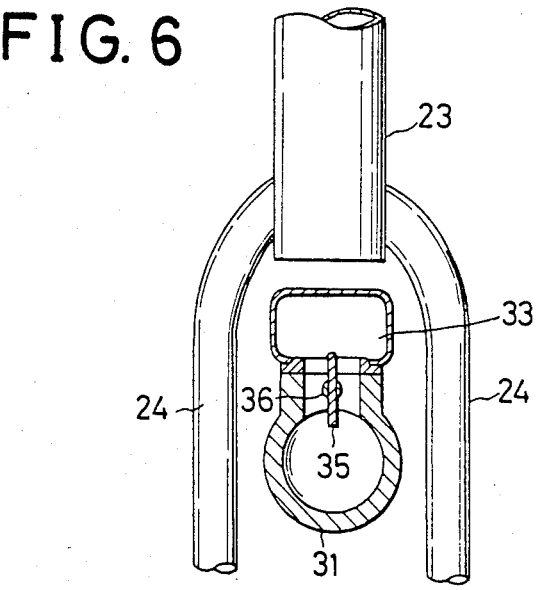
FIG. 6 is a cross sectional front view of the exhaust device taken along the line VI—VI of FIG. 5.

Referring now to FIGS. 5 and 6 a second embodiment of the invention will be described.

As shown in the figures, a subchamber 33 having a bottle-like shape is connected to the communicating tube 31 via the supporting tube portion 32 which have similar configuration as the previous embodiment. In this embodiment, the subchamber 33 is located in a space surrounded by the lower end portion of the down tube 23, the cradle pipes 24, and the communicating tube. With this arrangement, the above described space which was a dead space in the conventional arrangement is effectively utilized. Further, the subchamber 33 is effectively protected from an obstacle by means of the lower end of a front fender 38, down tube 23, cradle pipes 24, communicating tube 31 and the cylinder 28. In accordance with this feature, there are several advantages such that the subchamber 33 can be produced from a sheet metal so that the weight is reduced, or that the durability and the reliability of the subchamber are improved. Moreover, since the capacity required for the subchamber is within a range suited for the disposition in the above described dead space, the layout of the subchamber can be performed without altering the configuration of the frame.

Figure 7:
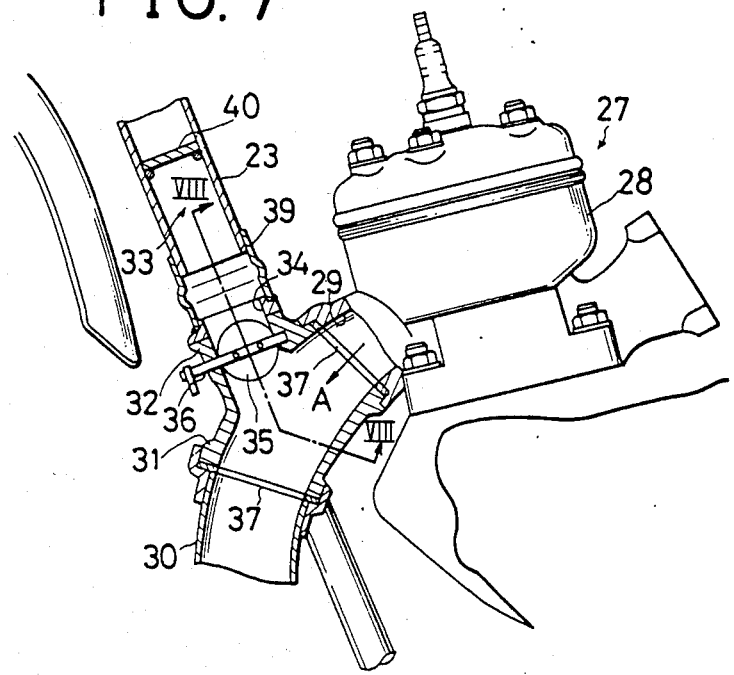
FIG. 7 is a partially cross sectional side view of a third embodiment of the exhaust device.
Figure 8:
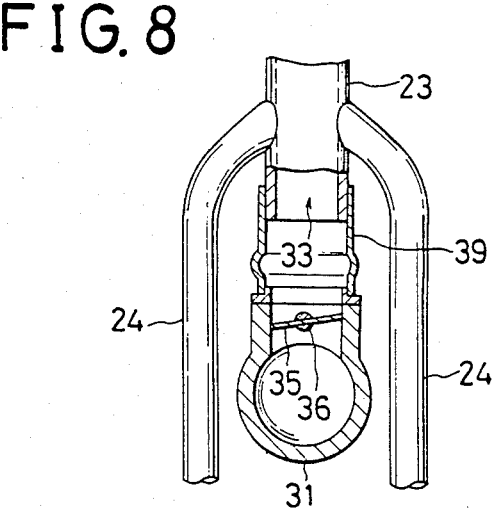
FIG. 8 is a cross sectional front view of the exhaust device taken along the line VIII—VIII of FIG. 7.

Turning to FIGS. 7 and 8, further embodiment of the exhaust device according to the present invention will be described. As shown, this embodiment is characterized by a connecting member 39 disposed between the supporting tube portion 32 and the lower end of the subchamber 23. Furthermore, a partition wall 40 is provided at a suitable level of the inside of the down tube. With this arrangement, the subchamber 33 is formed as the space defined by the connecting member 39 and the lower end portion of the down tube 23 which is separated from the upper portion by means of the partition wall 40. In the case of this arrangement, there is an advantage that the down tube is formed by using an existing part. This is especially advantageous for maintaining the form and the appearance of the motorcycle as a finished product, and it is needless to say that this arrangement does not disturb the position of the rider of the motorcycle. Moreover, the subchamber formed in this way has an outstanding strength and the capacity of the subchamber can be desirably determined by changing the position of the partition wall in the down tube. Therefore, the desirable capacity of the subchamber is secured appropriately in accordance with the engine displacement, regardless of the largeness or the smallness of the engine displacement.

Figure 9:
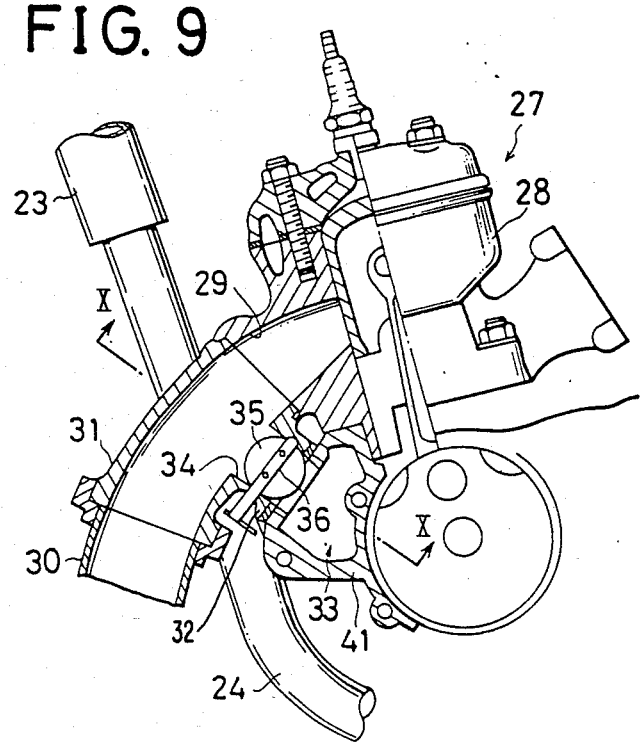
FIG. 9 is a cross secitonal side view of a fourth embodiment of the exhaust device.
Figure 10:
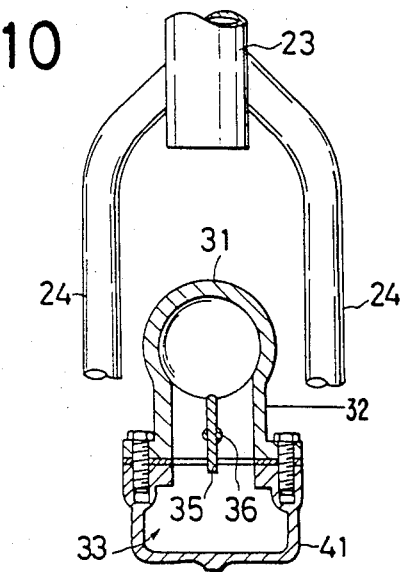
FIG. 10 is a cross sectional front view of the exhaust device taken along the line X—X of FIG. 9.

Reference is now made to FIGS. 9 and 10, another embodiment of the exhaust device according to the present invention will be further explained. As shown, in the case of this embodiment, the communicating tube 31 is connected between the exhaust port 29 of the engine 27 and the exhaust pipe 30 in the similar manner as the previous examples. However, in the case of this embodiment, the communicating tube 31 is provided with the supporting tube portion 32 in the rear side part thereof. The valve 35 is disposed in the supporting tube portion in the same manner as the previous cases. A part of a rigid body 41 serving as a crank case is directly fixed to an opening of the supporting tube portion 32 by means of screws as clearly shown in FIG. 10, and the subchamber 33 is formed in that part of the rigid body 41 so as to communicate with the supporting tube portion 32. In the case of this embodiment, there are advantages such that the deformation or the damage of the subchamber by the stones spattered by the front wheel is prevented because the subchamber is formed in the rigid body of the crank case. Therefore, the function of the subchamber will be maintained for a long time and the reliability of the use for a long time is improved. Furthermore, since the subchamber is located in a dead space between the cradle pipes and the body of the engine, the advantages of the previous cases can be also obtained in this arrangement.

Figure 11:
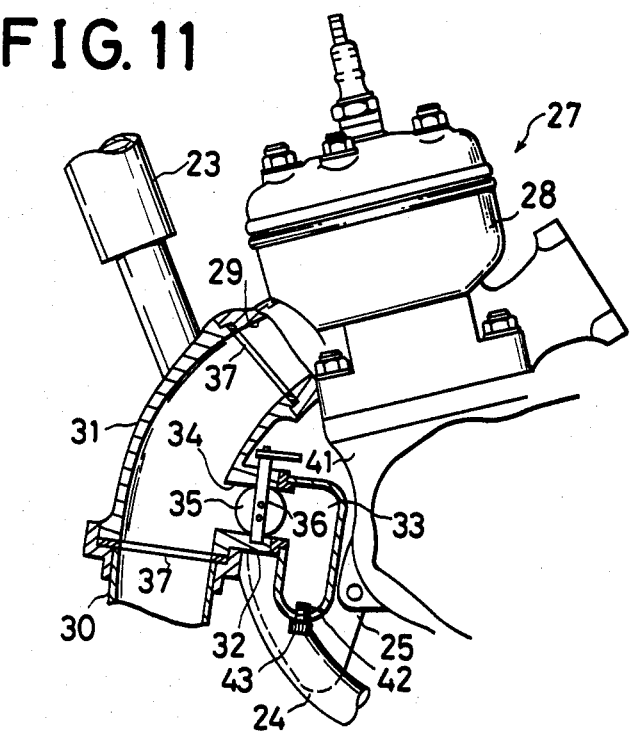
FIG. 11 is a cross sectional side view of a fifth embodiment of the exhaust device according to the present invention.
Figure 12:
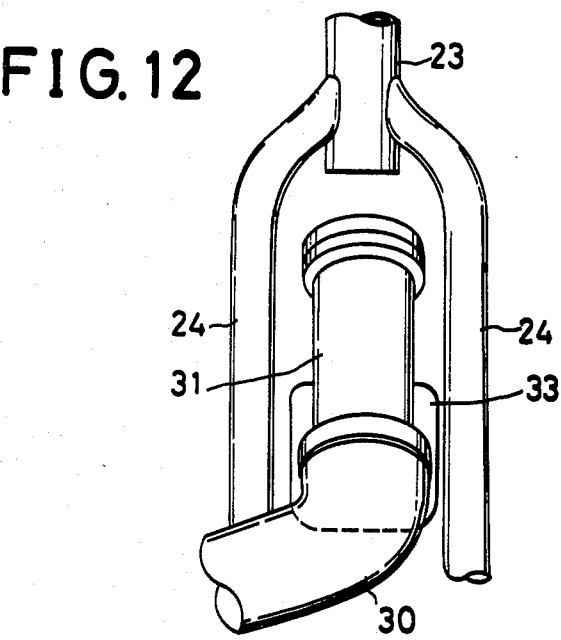
FIG. 12 is a front view corresponding to FIG. 11.

Reference is now made to FIGS. 11 and 12 in which the last embodiment of the exhaust device according to the present invention is illustrated. As shown, in this embodiment, the communicating tube 31 has a construction similar to that of the previous embodiment and a subchamber 33 made from a sheet metal is disposed in a dead space surrounded by the communicating tube 31, the cradle pipes 24, and the crank case 41 of the engine 27. In addition, the subchamber 33 is provided with a drain port 42 and a screw 43 for periodically discharging the engine oil accumulating in the subchamber 33. With this arrangement, there are several advantages such that the weight of the subchamber can be reduced by using a sheet metal as the material thereof, and the durability or the reliability of the use of a long time is improved because the subchamber is protected by such member as the cradle pipes 24, communicating tube 31, crank case 41 and further the bracket 25 supporting the engine 27. In addition, since the capacity of the subchamber 33 is within the range suited to be arranged in the above described space, the layout of the subchamber can be performed without altering the frame structure, as was the case in the previous embodiment.

Furthermore, since the subchamber is disposed behind a high temperature portion of the exhaust pipe, and is not exposed to the running wind, the temperature change of the subchamber can be maintained relatively small, and the operating characteristics of the subchamber can be maintained constant.

It should be understood that the foregoing description is for illustrative purpose only, and is not intended to limit the scope of the invention. Rather, there are numerous equivalents to the preferred embodiments, and such are intended to be covered by the appended claims. As an example, although the explanation has been made by way of examples of a motorcycle with two wheels, the invention is also applicable to a type of motorcycle which has two rear wheels but otherwise has substantially the same body construction as the usual motorcycle.

What is claimed is:

1. An exhaust device for a motorcycle having two-cycle engine and a frame including a head pipe rotatably supporting a steering stem, a down tube extending downwardly from the head pipe, and a pair of cradle pipes branching off from the down tube and on which the engine is mounted, comprising;
    a subchamber branching off from an exhaust pipe of the engine; and
    a valve body located in an entrance portion of said subchamber and in which a valve is mounted to open and close the entrance portion of the subchamber in accordance with a speed of rotation of the engine, wherein said subchamber is disposed in a space in front of the engine and surrounded by said down tube and said pair of cradle pipes.

2. An exhaust device as set forth in claim 1, further comprising a separate communicating tube detachably disposed between an exhaust port of the engine and said exhaust pipe, a supporting tube portion formed continuously with said communicating tube with said valve mounted in said supporting tube portion, and said subchamber extending from said supporting tube portion.

3. An exhaust device as set forth in claim 1, wherein said subchamber is disposed in a space surrounded by said cradle pipes, said exhaust pipe, and a crank case of the engine.

4. An exhaust device for a motorcycle having two-cycle engine and a frame including a head pipe rotatably supporting a steering stem, a down tube extending downwardly from the head pipe, and a pair of cradle pipes branching off from the down tube and on which the engine is mounted, comprising:
    a subchamber branching off from an exhaust pipe of the engine; and
    a valve body of located in an entrance portion of said subchamber and in which a valve is mounted to open and close the entrance portion of the subchamber in accordance with a speed of rotation of the engine, wherein a lower end of said down tube is opened and said subchamber is disposed in a hollow space of the lower end of the down tube.

5. An exhaust device for a motorcycle having two-cycle engine and a frame including a head pipe rotatably supporting a steering stem, a down tube extending downwardly from the head pipe, and a pair of cradle pipes branching off from the down tube and on which the engine is mounted, comprising:
    a subchamber branching off from an exhaust pipe of the engine; and
    a valve body of located in an entrance portion of said subchamber and in which a valve is mounted to open and close the entrance portion of the subchamber in accordance with a speed of rotation of the engine, wherein a lower end portion of said down tube is communicated with a portion branching off from said exhaust pipe, and a partition wall is provided in said down tube at a predetermined level from the lower end, thereby forming the subchamber in the lower end portion of the down tube.

6. An exhaust device for a motorcycle having two-cycle engine and a frame including a head pipe rotatably supporting a steering stem, a down tube extending downwardly from the head pipe, and a pair of cradle pipe branching off from the down tube and on which the engine is mounted, comprising:
    a subchamber branching off from an exhaust pipe of the engine; and
    a valve body of located in an entrance portion of said subchamber and in which a valve is mounted to open and close the entrance portion of the subchamber in accordance with a speed of rotation of the engine, wherein said subchamber is formed in a body of a crank case of the engine.

* * * * *

UNITED STATES PATENT AND TRADEMARK OFFICE
CERTIFICATE OF CORRECTION

PATENT NO. : 4,545,200
DATED : October 8, 1985
INVENTOR(S) : Ikuo Oike & Takahide Miyata It is certified that error appears in the above—identified patent and that said Letters Patent is hereby corrected as shown below:

Column 2, line 11 correct the spelling of "invention".
Column 2, line 24 correct the spelling of "communicating".
Column 2, line 61 correct the spelling of "sectional".
Column 3, line 23 correct the spelling of "disassemble".
Column 4, line 37 "subchamber" to --down tube--.
Column 4, line 44 change "down tube" to --subchamber--.

Signed and Sealed this

Fourth Day of March 1986

[SEAL]

Attest:

DONALD J. QUIGG

Attesting Officer    Commissioner of Patents and Trademarks